United States Patent
Chang et al.

(10) Patent No.: US 8,414,856 B2
(45) Date of Patent: *Apr. 9, 2013

(54) METHOD AND DEVICES FOR PRODUCING AIR SENSITIVE ELECTRODE MATERIALS FOR LITHIUM ION BATTERY APPLICATIONS

(76) Inventors: Chun-Chieh Chang, Ithaca, NY (US); Tsun-Yu Chang, Taichung (TW)

(*) Notice: Subject to any disclaimer, the term of this patent is extended or adjusted under 35 U.S.C. 154(b) by 704 days.

This patent is subject to a terminal disclaimer.

(21) Appl. No.: 12/380,298

(22) Filed: Feb. 26, 2009

(65) Prior Publication Data

US 2009/0169454 A1 Jul. 2, 2009

Related U.S. Application Data

(62) Division of application No. 11/413,690, filed on Apr. 29, 2006.

(51) Int. Cl.
*C01B 25/45* (2006.01)

(52) U.S. Cl.
USPC ... 423/306; 429/221; 429/231.5; 429/231.95; 429/223

(58) Field of Classification Search ............ 429/221, 429/231.95, 231.5, 223; 423/306
See application file for complete search history.

(56) References Cited

U.S. PATENT DOCUMENTS

| 7,264,767 B2 | 9/2007 | Schliefer et al. ............ 266/220 |
| 2004/0265695 A1* | 12/2004 | Barker et al. ............ 429/231.9 |
| 2006/0119024 A1 | 6/2006 | Ukaji et al. ............ 266/217 |
| 2007/0001153 A1* | 1/2007 | Barker et al. ............ 252/518.1 |
| 2007/0212606 A1 | 9/2007 | Chang ............ 429/221 |
| 2007/0221122 A1 | 9/2007 | Kitaoka et al. ............ 117/951 |

FOREIGN PATENT DOCUMENTS

JP  402176389 A  7/1990

* cited by examiner

*Primary Examiner* — Jun Li (74) *Attorney, Agent, or Firm* — Kratz, Quintos & Hanson, LLP (57) ABSTRACT

A unit for use within a furnace chamber having a gaseous environment of air, for carrying out a synthesizing process for synthesizing precursors to form a synthesized product at elevated temperatures. The materials of the synthesizing process are separated from the air of the furnace chamber by the vessel or the reductive material.

1 Claim, 8 Drawing Sheets

METHOD AND DEVICES FOR PRODUCING AIR SENSITIVE ELECTRODE MATERIALS FOR LITHIUM ION BATTERY APPLICATIONS

CROSS-REFERENCE TO RELATED APPLICATION

This application is a Divisional Application of application Ser. No. 11/413,690, filed Apr. 29, 2006.

FIELD OF THE INVENTION

The present invention is concerned with reaction chambers to be utilized for the mass production of air sensitive materials, especially for the synthesis of electrode materials for lithium batteries.

BACKGROUND OF THE INVENTION

Oxidation and reduction reactions are commonly utilized for the synthesis of inorganic crystalline materials. This is especially true for the synthesis of electrode materials for Li-ion batteries including cathode and anode materials. Conventionally, cathode materials such as lithium cobalt oxide, lithium nickel oxide, lithium manganese oxide and the mixed oxides are synthesized under oxidative environments. These materials are more readily obtainable since control of an oxidative heat treatment environment (e.g. heat treatment in open air environment) is not difficult. In contrast, a reductive environment is less feasible since control of a reductive heat treatment atmosphere is difficult. The difficulty stems from the fact that during the heat treatment steps of the synthesis, especially at elevated temperatures (e.g. >500° C.), a slight leakage of air during the heat treatment would be detrimental for the reaction and therefore degrade the quality of the synthesized materials. The difficulties in controlling a reductive atmosphere make mass production unlikely or very expensive. One example is the synthesis of lithium iron phosphate that is conventionally synthesized in a reducing or inert atmosphere. A $LiFePO_4$ type cathode material has been discussed for replacing $LiCoO_2$ for lithium ion battery applications because of the potentially lower cost (Fe replacing Co) and the safer operating characteristics of the material (no decomposition of the material during charging). However, processing issues such as high temperature heat treatment (>600° C.) under an inert or reducing atmosphere makes the material expensive and it is not widely accepted. Until the present, the maintenance of a reducing or an inert atmosphere at a high temperature was still a key factor limiting good control of the quality of the synthesized materials. To ensure a complete seal of the furnace, especially when heat treated at high temperatures, is very difficult.

Prior arts such as U.S. Pat. Nos. 5,910,382, 6,723,470, 6,730,281, 6,815,122, 6,884,544, and 6,913,855, in general, teach methods and precursors utilized for the formation of stoichiometric $LiFePO_4$, or the substitution of cations for iron. The above mentioned patents only show how the materials are synthesized. None of the prior art teaches how to control the heat treatment environment efficiently and cost effectively.

OBJECTS OF THE INVENTION

It is an object of the present invention to provide methods and devices for controlling a heat treatment environment that can be widely applicable to the synthesis of materials to form electrode materials. It is a further object of the invention to provide methods and devices that are cost effective and insure good quality of the synthesized material.

SUMMARY OF THE INVENTION

The present invention is a unit, for use within a furnace absent a controlled atmosphere, in a synthesizing process for synthesizing precursors to form a synthesized product at elevated temperatures. The unit has a vessel, having at least one opening, for containing materials of the synthesizing process, and a solid reductive material, wherein the materials of the synthesizing process are separated from the atmosphere of the furnace by either the vessel or the reductive material.

BRIEF DESCRIPTION OF THE DRAWINGS

The invention will become more readily apparent from the following description of preferred embodiments thereof shown, by way of example only, in the accompanying drawings, wherein.

DETAILED DESCRIPTION OF THE INVENTION

FIGS. 1(a)-1(e) show schematic diagrams of individually sealed units (ISU) containing materials that are subjected to the synthesizing heat treatments. Designs of furnaces that contain the ISUs of different geometries are shown in FIGS. 2(a) and 2(b).

Figure 1A:
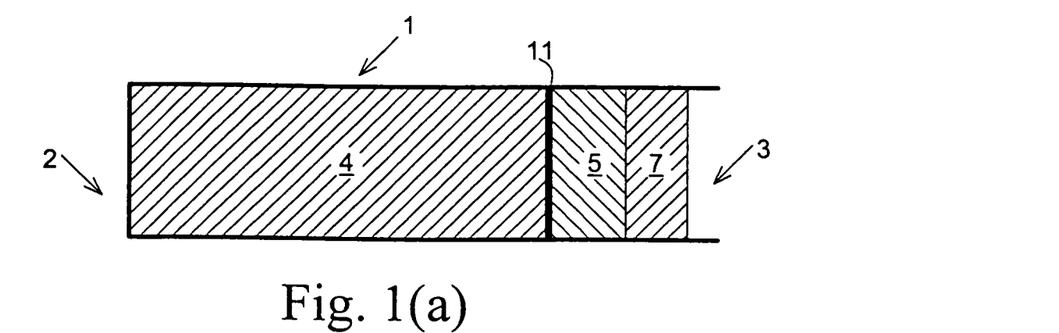
FIGS. 1(a) and 1(b) are illustrations of a first embodiment of the unit of the invention.
Figure 1B:
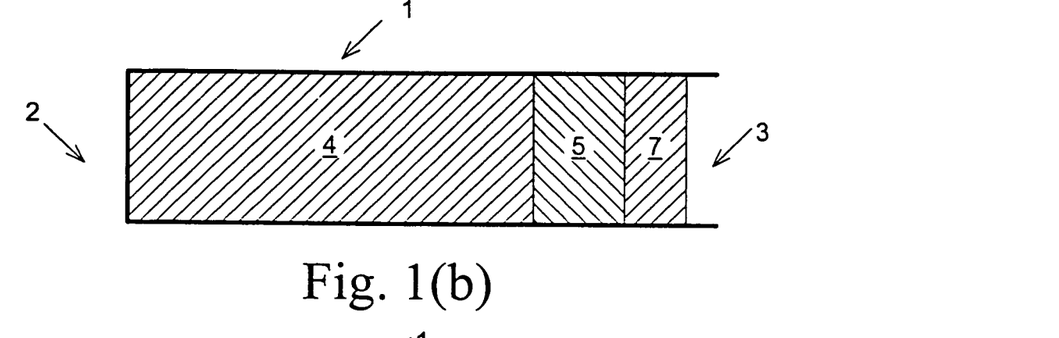
Figure 2A:
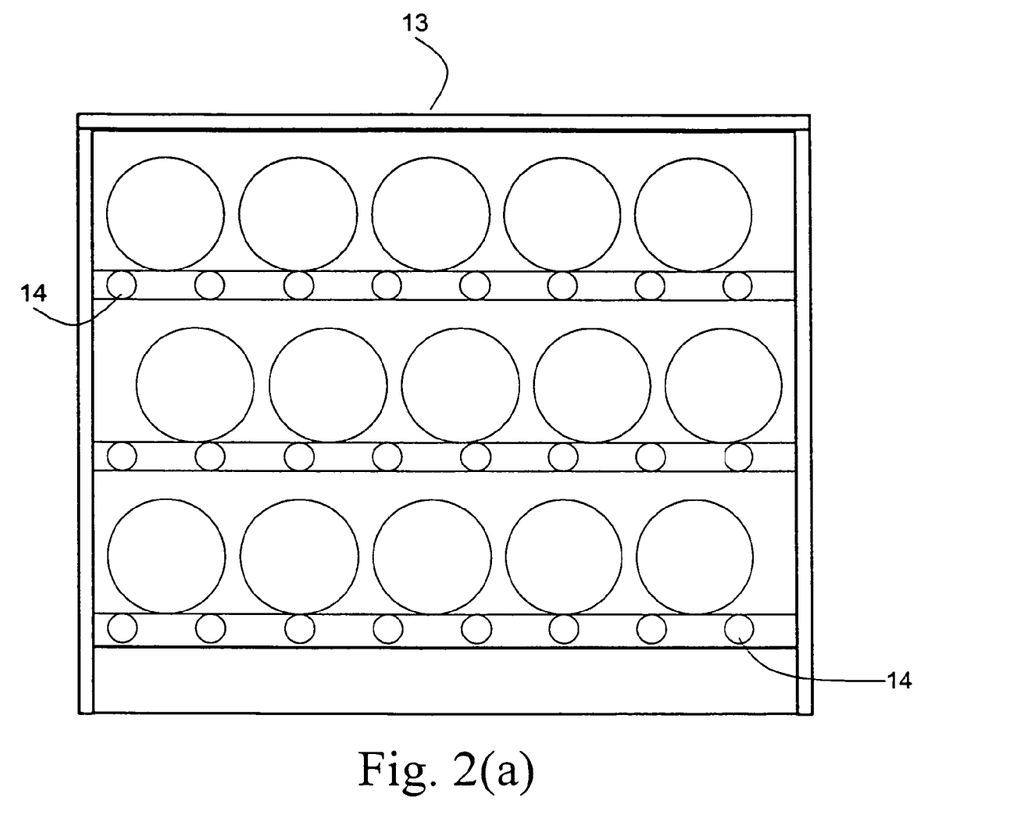
FIG. 2(a) is an illustration of units of the first and/or second embodiments in a furnace for carrying out a synthesizing process.
Figure 2B:
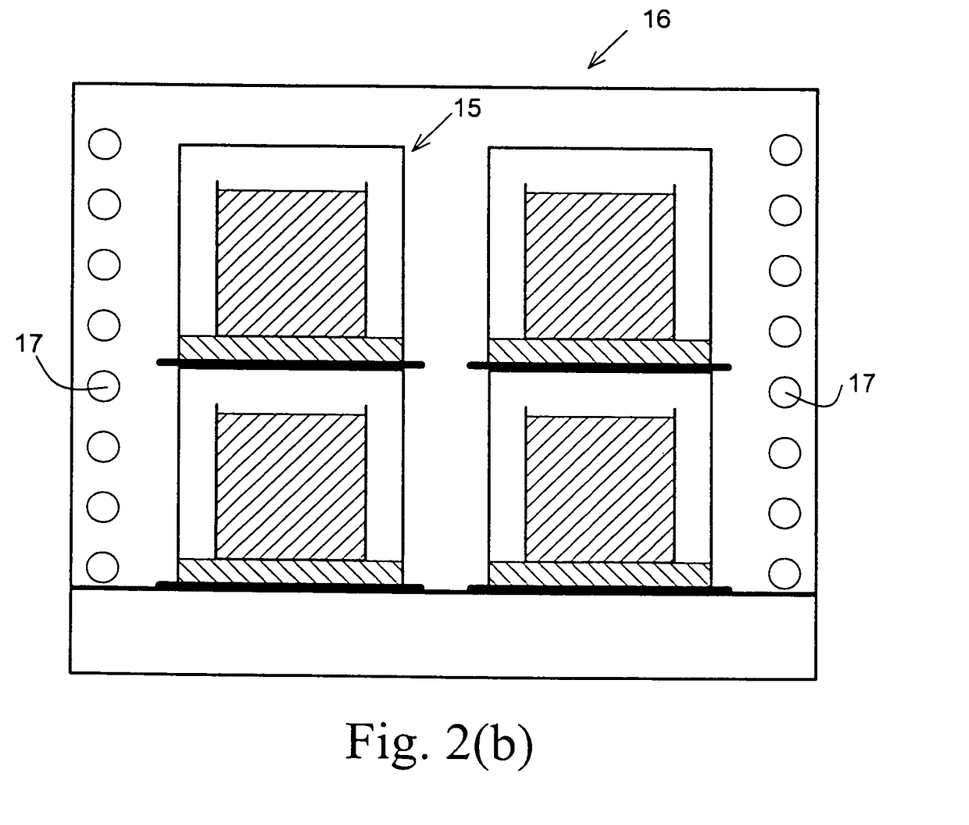
FIG. 2(b) is an illustration of units of the third embodiment in a furnace for carrying out a synthesizing process.

In FIGS. 1(a) and 1(b) the ISU 1 is a vessel having one end 2 completely sealed while the other end 3 is open to the atmosphere. Precursors to be synthesized to form an electrode material are contained at 4. The precursors, intermediate products, and resulting material of the synthesizing process are referred to as materials of the synthesizing process throughout the description. The materials of the synthesizing process, contained at 4, are protected from the atmosphere of the furnace, into which ISUs are placed for heating, by either the material of the vessel 1, or a solid reductive material layer 5 that limits the permeation of air from the furnace atmosphere. It should be mentioned that since the reductive material (e.g. carbon black) is usually porous, the porosity of the reductive material layer would allow the permeation of any gas by-product released from the material being synthesized, to the atmosphere. In general, either the gas by-product or the oxidation of the reductive material would generate gas and keep the pressure within the ISU positive, compared to the atmosphere. However, if the material being synthesized does not generate gas as a by-product, a decrease of the porosity of the reductive material layer (by means of tapping, for example) would ensure separation from the atmosphere.

Figure 1C:
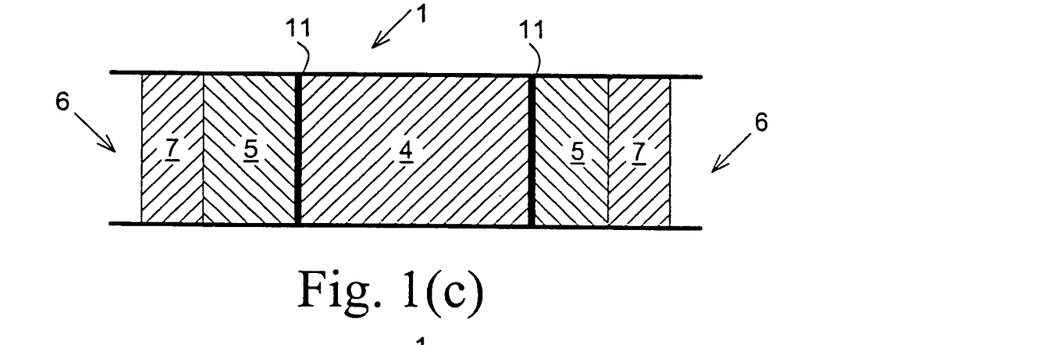
FIGS. 1(c) and 1(d) are illustrations of a second embodiment of the unit of the invention.
Figure 1D:
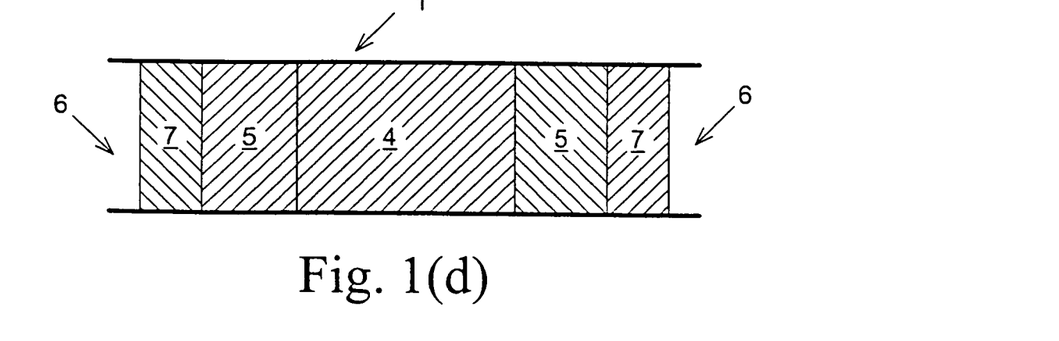

In FIGS. 1(c) and 1(d) each ISU of a second embodiment is a vessel 1 having both ends 6 open to the environment. Precursors to be synthesized to form an electrode material are contained at 4. The materials of the synthesizing process, contained at 4, are protected from the atmosphere of the furnace, into which ISUs are placed for heating, by solid reductive material layers 5 that limit the permeation of air from the furnace atmosphere. As mentioned above, the solid reductive material is usually porous to allow permeation of any gases resulting from the synthesizing process.

In both of the embodiments, a divider 11 can be used to separate the reductive material 5 from the material 4 of the synthesizing process. The divider preferably is inert to the materials being separated and porous to any gases being generated. Also, as shown in FIGS. 1(a)-1(d), at 7, a high-temperature durable glass fiber packing can be used to hold all of the materials in the vessels.

Figure 1E:
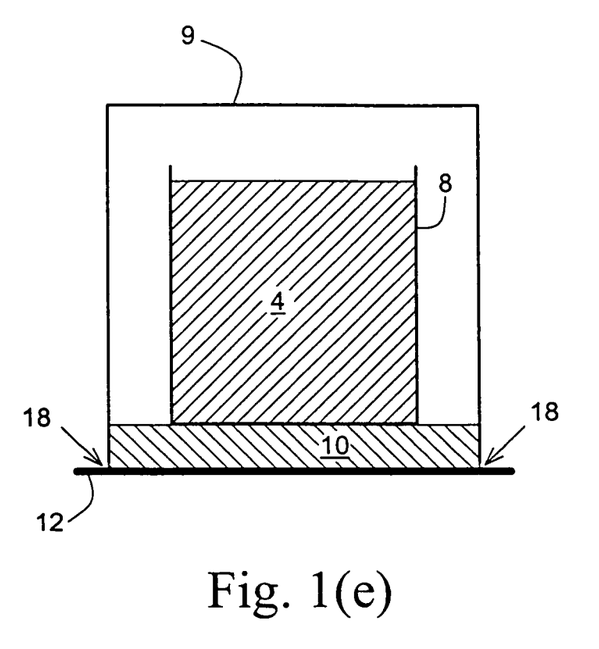
FIG. 1(e) is an illustration of a third embodiment of the unit of the invention.

Similar characteristics can be observed in a third embodiment of an ISU shown in FIG. 1(e). From FIG. 1(e), it can be seen that the materials to be synthesized 4 are contained in a crucible 8. The path of airflow from any open side of a vessel 9 is controlled by the presence of reductive material 10. A bottom of the crucible separates the reductive material from the materials of the synthesizing process. A tray 12 facilitates handling of the unit. Vessel 9 is not sealed tightly against tray 12 in order that gases can flow freely to or from the reductive material, as shown at 18.

FIGS. 2(a) and 2(b) show the various embodiments of the invention as utilized in a furnace to carry out the synthesizing process.

In FIG. 2(a) first embodiments and/or second embodiments are shown in furnace 13. Heating elements of the furnace are shown at 14.

In FIG. 2(b) four units of the third embodiment of the invention are shown at 15 in furnace 16. Heating elements of the furnace are shown at 17. As mentioned above, the furnaces are not required to be sealed and a controlled inert or reducing environment is not necessary.

The common structures of the ISUs are as follows:
a. An ISU includes a space that contains the materials being subjected to the synthesizing heat treatment;
b. An ISU includes a space that contains the reductive material;
c. The reductive material is placed in the vessel in a manner as:
Uncontrolled atmosphere/reductive material/synthesized material (FIGS. 1(a) and 1(b)), or
uncontrolled atmosphere/reductive material/synthesized material/reductive material/uncontrolled atmosphere (FIGS. 1(c) and 1(d));
d. The reductive material can be placed on top of the synthesized material as shown in FIGS. 1(a)-1(d) or somewhere else in contact with the outer atmosphere as shown in FIG. 1(e);
e. The ISU can dissipate gas generated by the synthesizing reaction.

In the embodiments of FIGS. 1(b) and 1(d) the flow of gases is from the materials of the synthesizing process, through the reductive material to the uncontrolled atmosphere, or the reverse of same.

In the embodiments of FIGS. 1(a) and 1(c) the flow of gases is from the materials of the synthesizing process, through the separator, through the reductive material to the uncontrolled atmosphere, or the reverse of the same.

In the embodiment of FIG. 1(e) the flow of gases is from the materials of the synthesizing process, through the separation between the crucible and the vessel, through the reductive material to the uncontrolled atmosphere, or the reverse of same. Other advantages provided by the utilization of ISUs include:

A. No need for an inert atmosphere in the furnace, thus resulting in:
  i. Easy scale up for production;
  ii. Much lower cost of a furnace since a gas-tight furnace becomes unnecessary;
  iii. The cost of inert gas can be saved;
  iv. Overall cost of the synthesis protocol is reduced; and
  v. Easy control of the quality of the resultant synthesized materials. Since one ISU can be considered as one furnace.
B. Good performance of the synthesized material as demonstrated in the following examples.
C. Consistency in performance of the synthesized material, which is extremely important for battery applications.

Owing to the advantage of the controlled heat treatment environment provided by the ISUs, materials that require heat treatment under an inert atmosphere can be obtained easily and cost efficiently. Following are examples of materials synthesized in an ISU of the invention, in order to better describe use of the invention.

Example 1

Synthesis of $LiFePO_4$ Using Methods and Devices of the Invention

In order to demonstrate the novelty of the ISUs disclosed in the present patent application, the synthesis of conventional $LiFePO_4$ in bulk quantity is used. 12 kg (75 moles) of $Fe_2O_3$ and 5.55 kg (75 moles) of $Li_2CO_3$ and 1.8 kg (150 moles) of Super P (carbon black, available from MMM Carbon, Belgium), molar ratio of (1:1:2), were mixed together with the addition of a suitable amount of water to form a paste. After mixing thoroughly, the proper stoichiometric amount of phosphoric acid was added and extended mixing was utilized (6 hours). Finally, the slurry was dried in air at 150° C. for 10 hours, followed by further heat treatment at 400° C. for 10 hours until chunks of materials were obtained. The as-prepared material was then subjected to grinding and ball milling for about 12 hours. The ground powdery materials was then loaded into several ISUs as shown in FIG. 1(a) with the addition of a carbonaceous material placed directly on top of the ground powdery material for heat treatment. In practice, the carbonaceous material can be placed directly on top of the synthesized material or separated by a thin layer of porous glass fiber fabrics or other inert plate. The ISUs were then placed in a furnace as shown in FIG. 2(a).

The heat treatment was conducted at 650° C. for 24 hours resulting in the synthesized material. After the heat treatment step, slight grinding and sieving were conducted on the synthesized material. The post-heat treated materials were then ready for further tests, as will be described below.

The utilization of ISUs is not limited to the synthesis of lithium iron phosphate, or limited to the choice of starting materials and precursor processing steps described for the synthesis of lithium iron phosphate of the present example.

Figure 3:
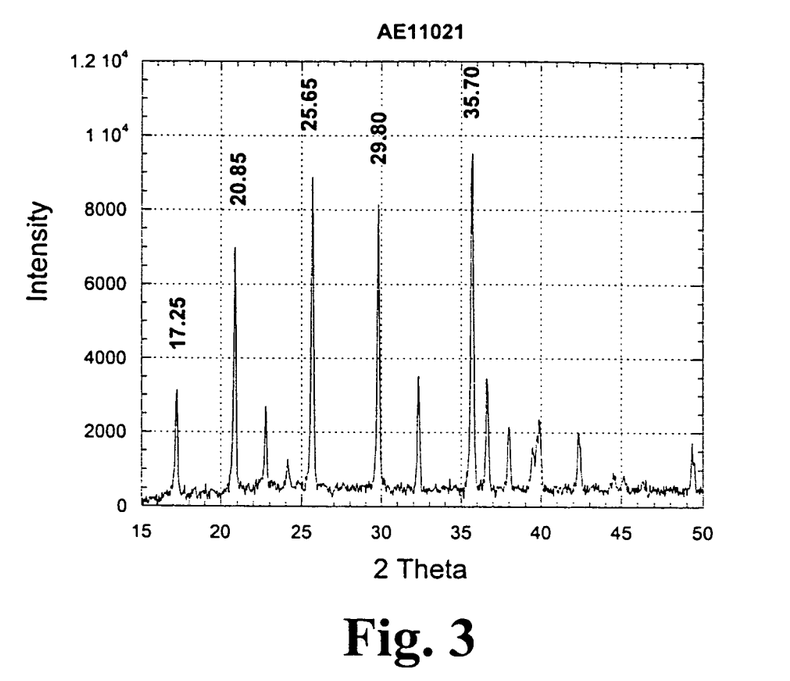
FIG. 3 is a graph of an x-ray diffraction pattern for a representative sample of a synthesized electrode material prepared using units of the invention.
Figure 4:
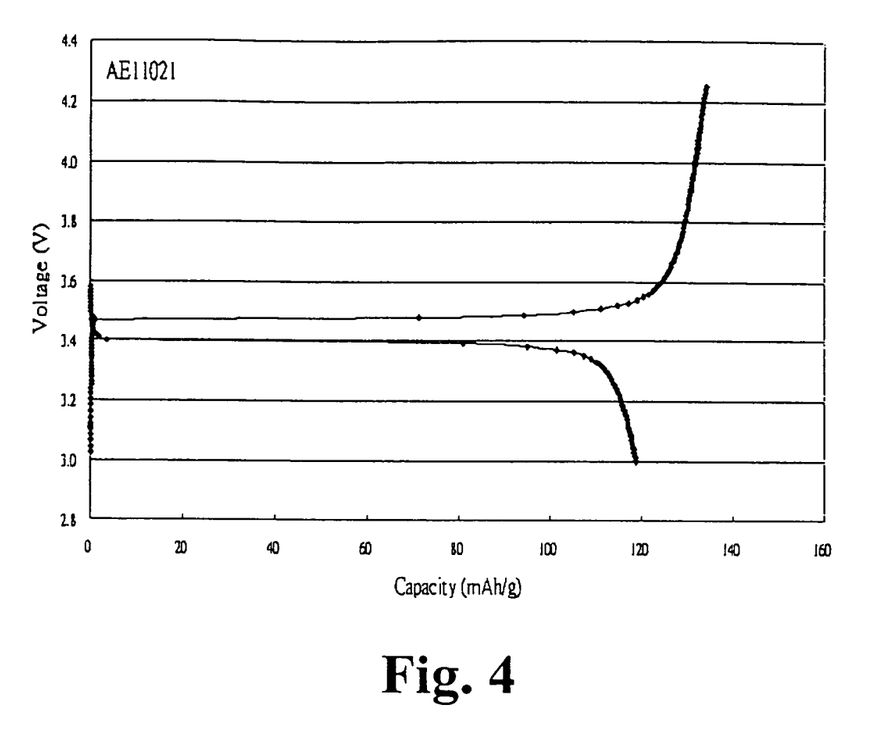
FIG. 4 is a graph for showing battery test data for the same material as in FIG. 3.

X-ray diffraction pattern data of the synthesized material is shown in FIG. 3. It is observed that phase pure material was obtained using the processing methods and devices presented in this example, without the use and control of an inert gas, such as nitrogen or argon. Battery test data (obtained using a three electrode design test battery and lithium is utilized as the reference electrode) are shown in FIG. 4. From FIG. 4 it can be seen that the capacity is high during the first charge-discharge cycle (~C/5 rate, 0.23 mA/cm$^2$). The material synthesized in the present case is comparable or superior to the prior art material disclosed in U.S. Pat. No. 6,723,470, which was obtained using an inert atmosphere as a heat treatment environment.

Example 2

Figure 5:
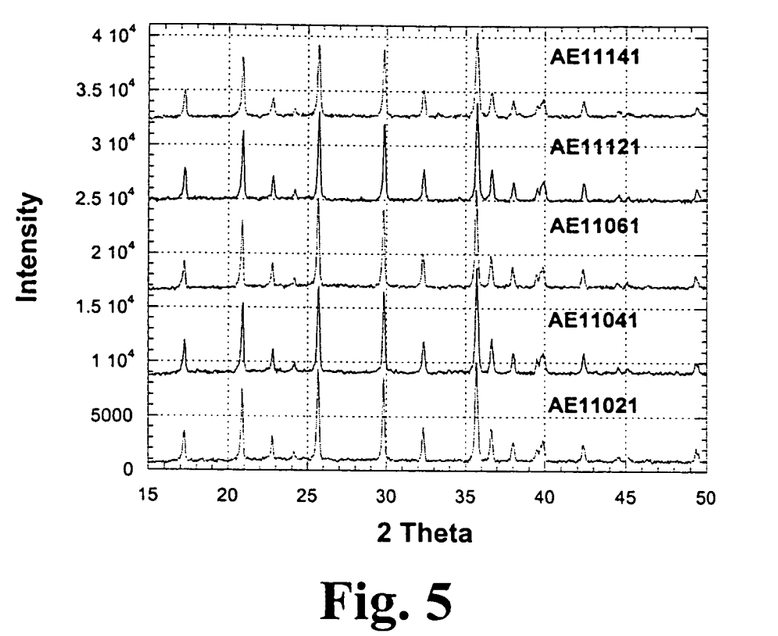
FIG. 5 is a graph of x-ray diffraction patterns for 5 similar synthesized electrode materials prepared using units of the invention.
Figure 6:
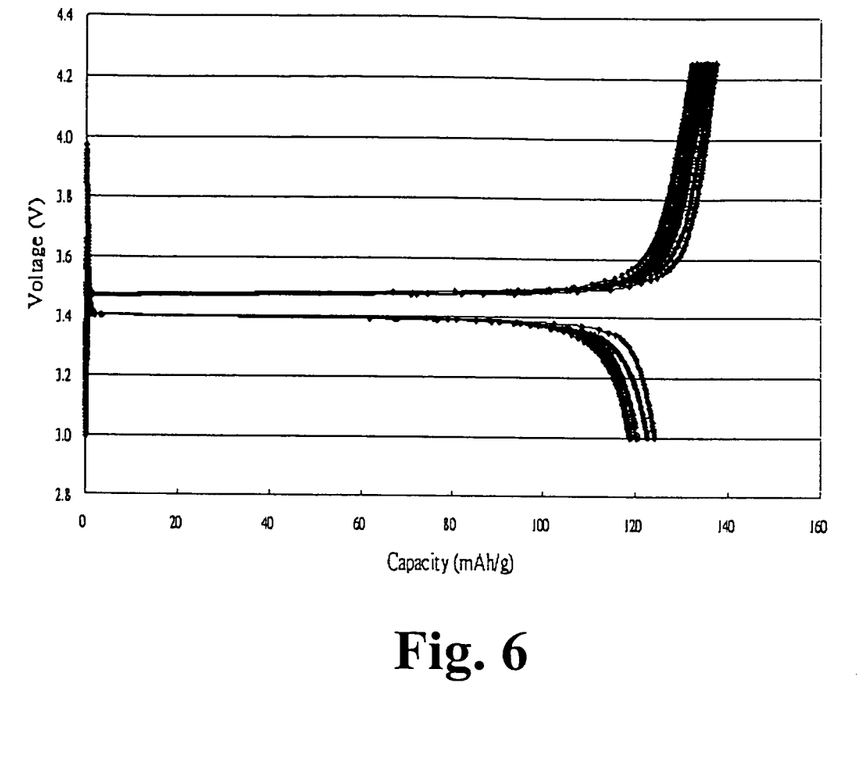
FIG. 6 is a graph for showing battery test data for 10 similar synthesized electrode materials prepared using units of the invention.

Demonstration of Consistently the Synthesized LiFePO$_4$ Using Methods and Devices of the Invention In the present example, ten batches of materials synthesized using the ISUs shown in FIG. 1(a) were tested for quality consistency. The precursor processing procedures for each batch were the same as the procedures described in example 1. The ten different batches were subjected to 10 identical heat treatment procedures in ISUs. From the ten batches, five batches were subjected to the x-ray diffraction pattern analyses and the results are shown in FIG. 5. Also, a stack of the 1$^{st}$ cycle data for each batch is shown in FIG. 6. More accurate numerical data is provided in Table 1. From FIG. 5 it can be seen that all of the materials are phase pure in nature. The peak intensity and peak positions for each sample are similar, as shown and indicated in FIG. 5. In FIG. 6, the 1$^{st}$ charge and discharge plot for each sample is again very similar. The 1$^{st}$ charge capacity ranges from 132~137 mAh/g and the 1$^{st}$ discharge capacity ranges from 118~124 mAh/g. All these data suggest that the consistency of the materials synthesized using the ISUs is insured.

TABLE 1

The detailed electrochemical data of the ten batches heat treated using the ISUs.

| Batch Names | 1$^{st}$ charge capacity (mAh/g) | 1$^{st}$ discharge capacity (mAh/g) | 1$^{st}$ charge average voltage (V) | 1$^{st}$ discharge average voltage (V) | 1$^{st}$ cycle Coulomb efficiency |
|---|---|---|---|---|---|
| AE11021 | 133.97 | 118.69 | 3.5083 | 3.3800 | 0.8859 |
| AE11031 | 132.15 | 118.64 | 3.5070 | 3.3805 | 0.8978 |
| AE11041 | 137.30 | 124.11 | 3.5016 | 3.3845 | 0.9039 |
| AE11051 | 135.29 | 118.60 | 3.5088 | 3.3778 | 0.8766 |
| AE11061 | 133.03 | 119.06 | 3.5066 | 3.3810 | 0.8950 |
| AE11121 | 132.14 | 118.75 | 3.5071 | 3.3608 | 0.8987 |
| AE11131 | 133.19 | 120.19 | 3.5083 | 3.3791 | 0.9024 |
| AE11141 | 135.69 | 122.59 | 3.5189 | 3.3794 | 0.9035 |
| AE11151 | 136.43 | 122.55 | 3.5109 | 3.3776 | 0.8983 |
| AE11161 | 134.71 | 120.52 | 3.5090 | 3.3778 | 0.8947 |

The devices of the present invention provide the following advantages. There is no need for the use of an inert gas in the furnace, such as nitrogen or argon, or forming gas (nitrogen plus hydrogen), thus a completely sealed furnace is not required. The ISUs are semi-open to the atmosphere of the furnace, thus sealing of the ISUs is not difficult. There is a short thermal diffusion distances from the heat source to the material being synthesized. With use of the reductive material, such as carbon black or carbonaceous materials for air permeation prevention, even if a small amount of air permeation occurs during heat treatment, oxidation of the carbonaceous material prevents further oxidation of the material being synthesized. The reductive material can be porous so to allow the dissipation of gas produced by the materials that are subjected to the heat treatment. The depth of the ISUs shown in FIGS. 1(a) and 1(b) are adjustable for the prevention of oxidation, for example a longer depth would give a better-isolated environment. Also, the geometry of the ISUs is flexible to accommodate the design of the furnaces, such as shown in FIGS. 2(a) and 2(b).

While specific materials, dimensional data, etc. have been set forth for purposes of describing embodiments of the invention, various modifications can be resorted to, in light of the above teachings, without departing from applicant's novel contributions; therefore in determining the scope of the present invention, reference shall be made to the appended claims.

The invention claimed is:

1. A process for use in a synthesizing process for synthesizing precursor materials to form a synthesized product at elevated temperatures within a furnace chamber, comprising providing a furnace having a furnace chamber with a gaseous environment of air open to the atmosphere, for heating precursor materials disposed in the furnace chamber, wherein gases within the furnace chamber consist essentially of gases resulting from heating the synthesizing precursors of the synthesizing process and air of the atmosphere entering the furnace chamber, placing the precursor materials into a vessel, said vessel having at least one opening which is open to gases within the furnace chamber, so as to have the precursor materials and a solid reductive material contained in the vessel, for the synthesizing process, placing the solid reductive material, porous to gases generated by the synthesizing process, across any opening in the vessel so that the precursor materials of the synthesizing process are completely surrounded by at least one of the vessel and the solid reductive material so as to be between said materials of the synthesizing process and the air of the atmosphere within the furnace chamber, and a flow of gases is from the materials of the synthesizing process, through the solid reductive material to the furnace chamber, or the reverse of same, placing the vessel having the contained precursor materials comprised of Fe$_2$O$_3$, Li$_2$CO$_3$, carbon black, and phosphoric acid in the furnace chamber, and heating the contained precursor materials to a synthesizing temperature greater than 600° C., and the synthesized product is LiFePO$_4$.

* * * * *